Oct. 16, 1956     K. M. WATSON     2,767,129
PROCESS AND APPARATUS FOR CONTACTING HYDROCARBONS
AND CATALYSTS PARTICLES IN A MOVING BED
Filed July 27, 1950
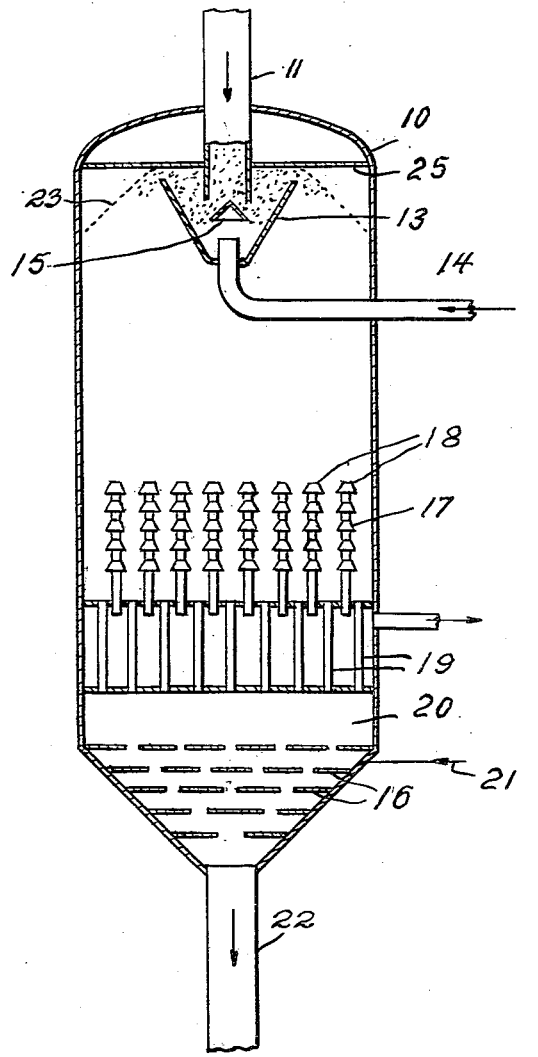
INVENTOR
KENNETH M. WATSON
BY
ATTORNEYS

United States Patent Office 2,767,129
Patented Oct. 16, 1956

2,767,129

PROCESS AND APPARATUS FOR CONTACTING HYDROCARBONS AND CATALYSTS PARTICLES IN A MOVING BED

Kenneth M. Watson, Madison, Wis., assignor to Sinclair Refining Company, New York, N. Y., a corporation of Maine Application July 27, 1950, Serial No. 176,090

4 Claims. (Cl. 196—52)

My invention relates to improvements in the conversion of petroleum hydrocarbons in contact with a moving bed of particle form cracking catalyst and particularly contemplates improved means for effecting the initial contacting of catalyst and hydrocarbons so as to permit direct introduction of a substantial proportion of the hydrocarbon charging stock in the liquid state.

One of the disadvantages of the conventional moving bed system of catalytic cracking, as exemplified by the Thermofor catalytic cracking units, has been the necessity of completely vaporizing the hydrocarbon charging stock in a heater and flash tower system before introducing it to the moving bed. A number of proposals have been made for effecting liquid injection of hydrocarbons in the moving bed system and one at least is now being adopted on a commercial scale. This system of liquid injection provides for charging up to 80 percent of the catalyst to the bed in the form of a falling cylindrical curtain of catalyst particles. The liquid portion of the feed, which usually represents about 30 percent of the total feed, is sprayed by an internally situated atomizing means circumferentially outward into contact with the falling catalyst curtain. The system however is difficult to control, requiring precise control of the atomizing jet. If the jet is too strong the catalyst is banged against the walls of the reactor, increasing catalyst breakage and tending to form carbonaceous deposits on the reactor walls. If the jet is too weak, liquid oil dribbles down within the falling cylindrical catalyst curtain into the bed where it causes over-carbonization of a portion of the catalyst to such an extent that it may be carried over to the regenerator. At best, only 80 percent of the catalyst is contacted with liquid oil, as the balance is introduced directly to the bed to be contacted only with the vapor portion of the feed. Thus considerable heterogeneity of hydrocarbon and catalyst contacting is inherent in the system which gives rise to over-cracking and under-cracking in the course of the conversion reaction. These heterogeneities carry over into the operation of the regenerator since they are associated with the kind and quantity of oil adsorbed on the catalyst particles. In addition, the present liquid feed system requires a considerable flight of free fall for the catalyst which contributes to the catalyst breakage problem.

My invention provides means for intimately commingling all of the hydrocarbon feed with all of the catalyst in a short mixing space before entry of either catalyst or oil into the bed. In accordance with my invention the catalyst is introduced to the upper portion of the bed maintained in the usual enlarged reaction vessel by gravity flow as a column through an elongated flow pipe or seal leg. The seal leg is long enough to prevent back passage of vapors. A blocking element is provided at the foot of the seal leg in order to prevent normal gravity flow of the catalyst from the seal leg by deflecting the direction of catalyst flow generally upward without blocking outward egress of the catalyst under applied pressure. Thus the blocking element may constitute a plate or dish which interrupts the normal vertical gravity flow and builds up a catalyst ring under the pressure of the catalyst head which blocks outward flow away from the foot of the seal leg. Thus the blocking element is located below the outlet of the catalyst flow pipe or seal leg so as to interrupt normal gravity flow but it is spaced from the outlet at a distance providing space for outward egress of the catalyst. The partially vaporized hydrocarbon stock, advantageously about 20 to 70 weight percent in the liquid state, is charged through the usual feed conduit to dispersing nozzle or distributing means situated within the space between the outlet of the catalyst flow pipe and the blocking element where it is sprayed into the catalyst at the foot of the seal leg at a velocity sufficient to flow the catalyst circumferentially outward. A vapor velocity through the space is required which will lift the body or ring of catalyst blocking outward flow by gravity and move it as an expanded stream away from the foot of the seal leg. The actual velocity will depend upon the distance, the size and proportioning of the space between the outlet of the seal leg and the blocking element, the density, size and shape of the catalyst particles and the quantity of the catalyst present. The vapor velocity may be calculated according to well known procedures, compensating for the above variables, but in any event it must be sufficient to provide a pressure drop in pounds per square foot per foot of length exceeding the bulk density of the catalyst. Steam injection in the hydrocarbon feed stream is advantageous for purposes of dispersion and increased available vapor volume.

My invention will be further described by reference to the accompanying drawing which illustrates schematically the essential features of a modified TCC reaction vessel. In the drawing, catalyst from the usual regenerator hopper flows into reaction vessel 10 through catalyst flow pipe or seal leg 11. Blocking means 13 in the form of a hollow inverted cone is located at the foot of seal leg 11 so as to deflect the direction of catalyst flow generally upward and by this means effectively interrupt normal gravity flow from the seal leg. In the embodiment of the drawing, the catalyst particles are shown building up against reactor seal plate 25. The employment of such a plate is advantageous in maintaining uniform conditions of flow over a variety of vapor velocity conditions. The rate of flow of catalyst into the reaction vessel is determined by the rate of withdrawal of catalyst from it. If withdrawal were stopped the catalyst would maintain a static equilibrium position, approximately as indicated by the dotted line 23, with the hydrocarbon vapors and liquid passing through the stationary catalyst bed. The hydrocarbon charging stock constituting a mixture of a vaporized light gas oil, a preheated heavy gas oil and steam is introduced through conduit 14 and by means of distributing means 15 is sprayed uniformly and circumferentially outward so as to lift the catalyst ring tending to block outward flow from the flow pipe 11 continuously outward onto the upper level of the moving bed gravitating down through reaction vessel 10.

Reaction vessel 10 is equipped with the usual flow controlling and distributing plates 16 in the bottom and with vapor disengaging tubes 17 located in an intermediate portion. The vapor disengaging tubes are of the known type equipped with vapor outlet orifices protected by conical shields 18. The separated spent catalyst passes downward through catalyst down pipes 19 into stripping section 20 where it is contacted with stripping steam admitted through connection 21. The stripped spent catalyst flowing from the reaction vessel 10 through draw-off 22 is transported in the usual manner either by mechanical or gas lift to a regeneration vessel in which deposited carbonaceous matter is burned off with air.

The operation of my new liquid feed injection system is illustrated by the following experimental data obtained by use of a 3000-gram catalyst hopper having a 36-mm. I. D. outlet at the bottom. The catalyst flow was deflected by location of a funnel-shaped element having a 60° angle, flared from the horizontal and dimensions of 65 mm. I. D. at the top and 13 mm. I. D. at the bottom below the hopper outlet. Air was introduced through the bottom of the funnel element at controlled rates measured by flow through a rotameter. The apparatus was filled with virgin Filtrol clay type catalyst pellets and the catalyst flow rate was measured at various air rates over the operable range. The air flow was controlled to simulate the mixed phase vapor and liquid feed to a commercial 10,000-barrel per day unit. The following data indicate that even at a catalyst loading of 1.7 pounds per cubic foot of vapor only 256 moles per hour of vapors would be necessary to maintain a catalyst flow rate of 120 tons per hour of catalyst. For the 10,000-barrel per day unit under consideration, there were actually 265 moles per hour of vapor available, figuring approximately 25 to 30 percent liquid feed.

| Air Rates, S. C. F. M. | Cat. Rate, lbs./min. | Loading, lbs. cat./Ft.$^3$ Air |
|---|---|---|
| 8 | Will not operate | |
| 9 | 7.3 | 0.81 |
| 10 | 11.0 | 1.10 |
| 13 | 22.0 | 1.69 |
| Free Flow [1] | 23.6 | |

[1] Funnel taken away from bottom of hopper.

The operation of a typical 10,000-barrel per day unit may be illustrated by a run with 3500 barrels per day of gas oil testing 50 percent at 710° F., charged at 840° F. and 6500 barrels per day of tar separator overhead at 950° F. The catalyst to the reactor was controlled at 1020° F. and the catalyst flow rate was 120 tons per hour. The operation averaged approximately 35 percent of stabilized 410° F. E. P. gasoline at 30 to 40 percent liquid feed.

Hence my invention provides apparatus and method for intimately contacting the hydrocarbon feed to a TCC type unit which contains substantial proportions of liquid feed with all of the catalyst flowing into the reaction vessel. By minimizing free fall of catalyst particles and high pressure jetting of the liquid feed components, catalyst attrition is successfully reduced to a minimum, while good dispersion resulting in uniform adsorption of the liquid components of the hydrocarbon charging mixture on the catalyst particles is obtained.

I claim:

1. In the conversion of petroleum hydrocarbons at a cracking temperature in contact with a moving bed of particle form cracking catalyst maintained in a reaction vessel, the method of initially contacting catalyst and hydrocarbons prior to formation of the moving bed which comprises introducing catalyst to an upper portion of the reaction vessel by gravity flow as a column through an elongated seal leg, preventing normal gravity flow of the catalyst from the foot of the seal leg to the moving bed by deflecting the direction of the flow generally outward and upward without blocking outward egress of catalyst under applied pressure, introducing the hydrocarbons in partially vaporized state as a dispersed stream into the deflected catalyst at the foot of the seal leg in a direction generally opposite to the downward flow of the catalyst at a velocity sufficient to flow the catalyst circumferentially outward to the moving bed at the desired flow rate to maintain the moving bed in the reaction vessel, and separating conversion products from the bed at a lower portion of the reaction vessel.

2. The method of claim 1 in which the proportion of liquid hydrocarbons in the feed is from 20 to 70 percent by weight.

3. In apparatus for the conversion of hydrocarbons in contact with a moving bed of particle form cracking catalyst, catalyst and hydrocarbon contacting means comprising a vertically positioned elongated catalyst flow pipe discharging into an enlarged reaction vessel, a flow blocking element below and beneath the outlet of the catalyst flow pipe and positioned to interrupt normal gravity flow of catalyst from the flow pipe to the moving bed but in spaced relation from the outlet of the pipe so as to provide a space for outward egress of catalyst, a conduit for introducing hydrocarbons through the space below the outlet of the catalyst flow pipe and distribution means for uniformly and circumferentially spraying the hydrocarbons into the space between the outlet of the catalyst flow pipe and the flow blocking element in a direction generally opposite to the normal gravity flow of the catalyst.

4. The apparatus of claim 3 in which the flow blocking element is in the form of a hollow inverted cone of larger base diameter than the cross-sectional diameter of the catalyst flow pipe.

References Cited in the file of this patent

UNITED STATES PATENTS

| | | |
|---|---|---|
| 2,458,162 | Hagerbaumer | Jan. 4, 1949 |
| 2,488,488 | Bergstrom | Nov. 15, 1949 |
| 2,548,286 | Bergstrom | Apr. 10, 1951 |
| 2,574,850 | Utterback et al. | Nov. 13, 1951 |
| 2,687,372 | Ray | Aug. 24, 1954 |